G. R. Kennedy,

Stretching Silk.

No. 103,051. Patented May 17, 1870.

Witnesses
Thos. H. Dodge
Geo. H. Miller

Inventor
George R. Kennedy

United States Patent Office.

GEORGE R. KENNEDY, OF WORCESTER, MASSACHUSETTS.

Letters Patent No. 103,051, dated May 17, 1870.

---

IMPROVEMENT IN MACHINES FOR STRETCHING SILK, &c.

---

The Schedule referred to in these Letters Patent and making part of the same

---

*To all whom it may concern:*

Be it known that I, GEORGE R. KENNEDY, of the city and county of Worcester, and Commonwealth of Massachusetts, have made certain new and useful Improvements in Machines for Stretching Silk and other fibrous threads composed of several separate strands; and I do hereby declare that the following is a full, clear, and exact description of the same, reference being had to the accompanying drawings forming part of this specification, in which—

Figure 1:
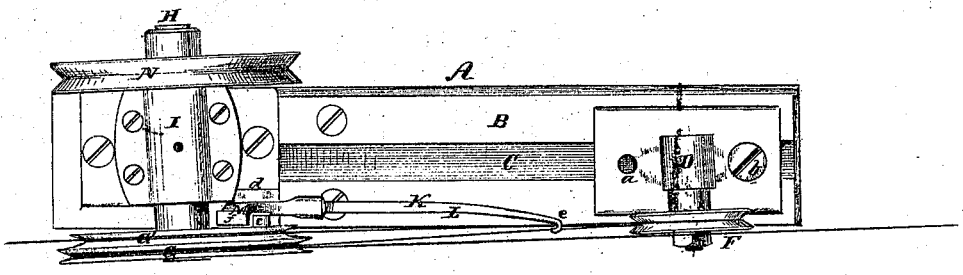
Figure 1 represents a top or plan view of my improved machine.

To enable those skilled in the art to which my invention belongs to make and use the same, I will proceed to describe it more in detail.

The nature of my invention consists in the combination with two or more stretching-pulleys, or grooves, of unequal diameters, secured to the same shaft, of an adjustable friction stretching-pulley, substantially as and for the purposes hereinafter explained.

In the drawings—

A represents the bed of the machine, upon the top of which is secured a plate B, having a dovetailed groove C, to receive a dovetailed projection on the bottom of the stand D.

The base E of the stand D is provided with screw-holes, $a$, to receive the screws $b$, whereby said stand, with its friction thread-stretching pulley F, can be adjusted nearer to or farther from the thread-stretching pulleys G G', which are secured to a journal H, fitted to turn in a bearing I, on the top of a stand J, secured to the base A.

The stretching-pulleys G G' are made of unequal diameters, as fully indicated in full and dotted lines.

In this instance they are cast in one piece, but they may be made separately, and arranged side by side upon the same shaft, or a cone pulley may be employed as a substitute therefor, guides being arranged thereon to keep the threads separated, so as to run upon different diameters of the same pulley.

A pin $c$, projects from the inner side of the stretching pulleys G G', while a stop-lever K is pivoted at $d$, between ears on the base of the stand J. The long arm L of said lever projects up, and is provided with a hook $e$, which rests upon the thread when the machine is in operation, as shown in the drawings, and, when in such position, the short arm M of said lever is thrown back towards the journal H, so as to be out of the path of the pin $c$, when the machine is in operation and the thread is running properly, but, as soon as the thread breaks, the long arm of lever K falls, thereby bringing finger $f$ of arm M in the path of pin $c$, thus stopping the stretching-pulleys G G', which are driven by a band running upon pulley N.

Arm M is made of sufficient length to extend above the center of the journal H, whereby, when pin $c$ strikes the top of finger $f$, there is no tendency to cant arm M back, thus insuring a positive and sudden stop to the stretching-pulleys when the thread breaks.

Figure 2:
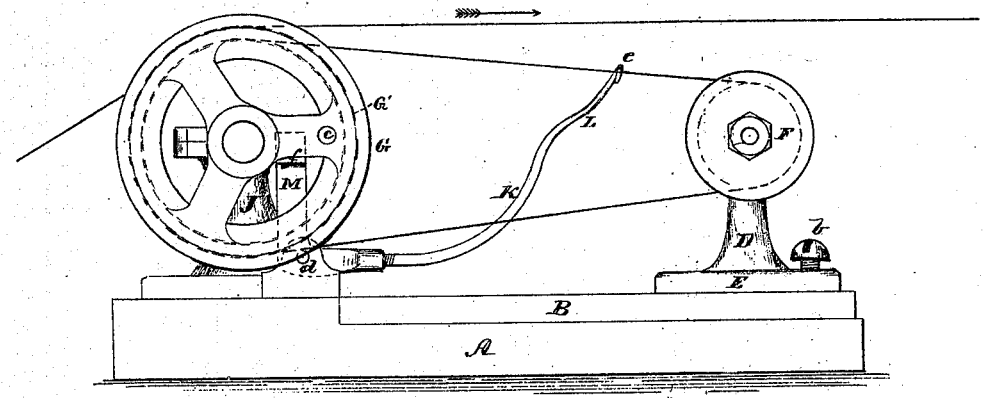
Figure 2 represents a side view of my improved machine.

The operation is as follows:

The silk being dampened and wound upon a bobbin fitted to turn upon a journal properly supported, and combined with a friction device whereby any desired degree of friction can be applied to said bobbin, the end of the silk is wound twice around the small stretching-pulley G', then over the friction stretching-pulley F, which turns upon a stationary journal upon the stand E, then back, and passed twice around the stretching-pulley G, and thence back above the friction stretching-pulley F, as indicated by the arrow in fig. 2, to a bobbin or spool turned by friction, upon which it is wound as fast as it is delivered by the stretching-pulley G.

From the foregoing description it will be seen that my machine is not only compact and perfect in its operation, but that any desired degree of stretch can be given to the silk or thread run through it, by simply adjusting stand D nearer to or further from the stretching-pulleys G G', since the stretch of the thread is in proportion to the distance between the stretching-pulleys G G' and the friction stretching-pulley F. Other things being equal, the greater the distance the less the tension and stretch of the thread are.

Having described my improved machine for stretching silk and other threads.

What I claim therein as new and of my invention and desire to secure by Letters Patent, is—

The combination with the stretching-pulleys G G', arranged on the shaft H, of the friction stretching-pulley F, supported on an adjustable stand, arranged in the grooved plate B, whereby the degree of stretch can be varied, substantially as described.

GEORGE R. KENNEDY.

Witnesses:
THOS. H. DODGE,
GEO. H. MILLER.